Jan. 29, 1935.  C. IVERSON  1,989,363
TIRE VULCANIZING APPARATUS
Original Filed Dec. 1, 1931    6 Sheets-Sheet 3

INVENTOR
CATO IVERSON.

BY

ATTORNEYS

Patented Jan. 29, 1935

1,989,363

UNITED STATES PATENT OFFICE 1,989,363

TIRE VULCANIZING APPARATUS

Cato Iverson, Akron, Ohio, assignor to National Rubber Machinery Company, Akron, Ohio, a corporation of Ohio Application December 1, 1931, Serial No. 578,247
Renewed June 26, 1934

23 Claims. (Cl. 18—17)

This invention relates to tire vulcanizing apparatus, and more especially it relates to apparatus for vulcanizing pneumatic tire casings.

The invention is of primary utility in the vulcanizing of tire casings of large cross-sectional diameter and small bead diameter wherein the removal of expansible cores heretofore has been a difficult problem. Applicant avoids the use of an expansible core and uses in its stead a sealing ring to close the recess between the beads of the tire while the tire is distended against a confining mold by vulcanizing fluid in contact with the inner wall of the tire. Although sealing rings of the character mentioned are not new per se, the invention comprises a novel combination of sealing ring and vulcanizer, together with an improved bead clamping ring engaging the tire and sealing ring, and mechanism for moving the sealing ring and bead clamping ring relatively of each other and of the vulcanizer.

The chief objects of the invention are to facilitate the vulcanization of pneumatic tire casings, especially tire casings of large cross-section and small bead diameter; to provide improved means for firmly holding a sealing ring concentrically between the beads of a tire; to obviate the use of a pair of bead clamping rings for holding the sealing ring in position; to provide vulcanizing apparatus requiring but one bead clamping ring for the purpose mentioned; to provide mechanical means for applying the bead-clamping ring to the tire and stripping it therefrom; and to provide means for moving the bead clamping ring and sealing ring relatively of each other and of the vulcanizer. Other objects will be manifest as the description proceeds.

Of the accompanying drawings.

Figure 1:
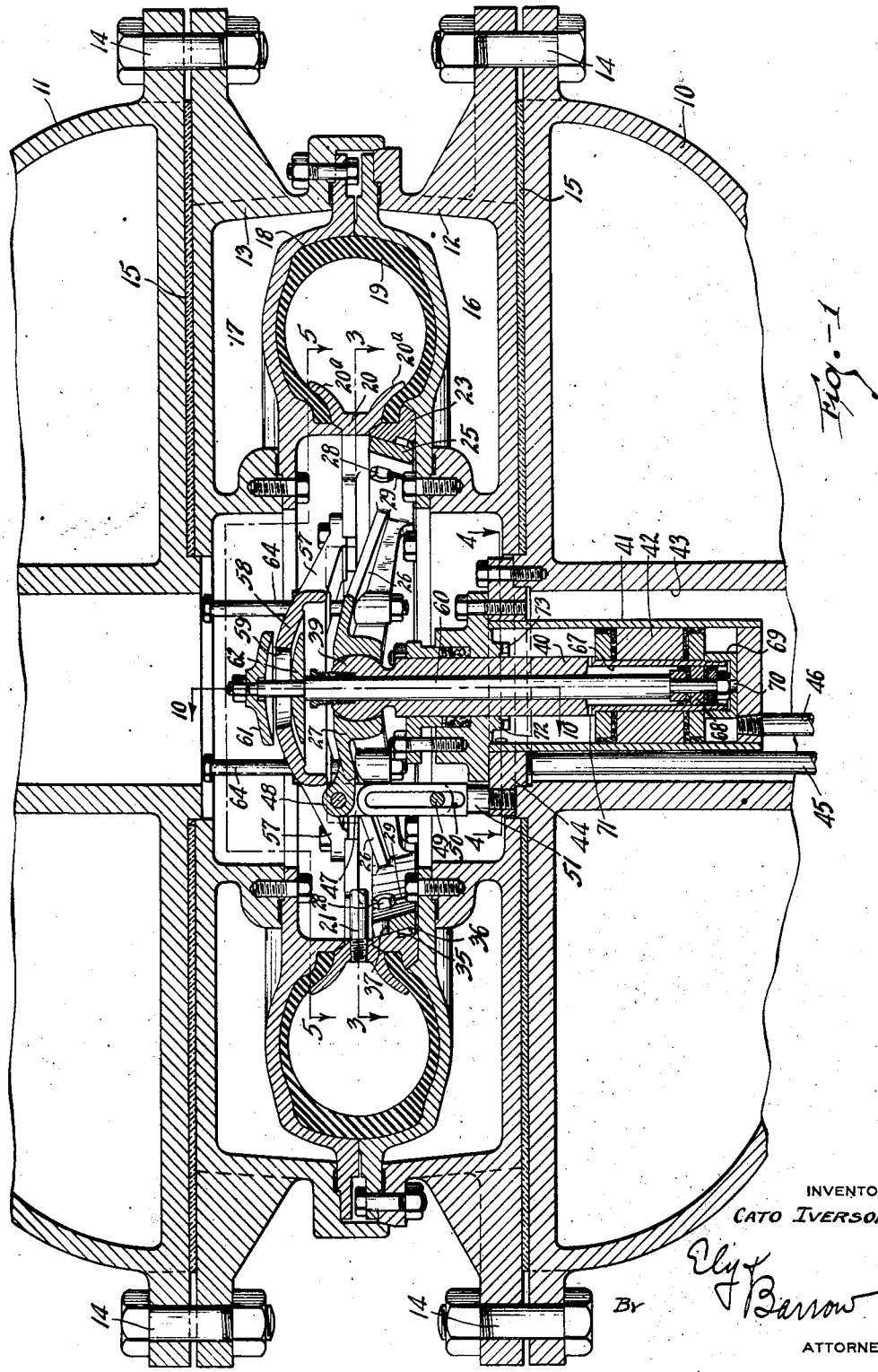
Figure 1 is a diametric section through a part of tire vulcanizing apparatus embodying the invention in its preferred form, and the work therein, the vulcanizer being in closed or vulcanizing position.

Referring to Figure 1 of the drawings, 10 is the lower half and 11 is the upper half or cover of a vulcanizer of the watchcase type. Any suitable means (not shown) may be provided for raising and lowering the cover 11, preferably mechanism which gives the cover 11 a movement of translation that is perpendicular to the parting plane of the vulcanizer sections in the initial opening movement of the cover and in the final closing movement thereof, such a mechanism being shown in my co-pending application, Serial No. 576,752, filed November 23, 1931.

The vulcanizer sections 10, 11 carry the upper and lower halves respectively of an annular steam-jacketed mold, said mold sections being designated 12 and 13. The mold sections are secured to the vulcanizer sections by bolts 14, 14 or the like, and suitable heat-insulating material, such as sheets of asbestos composition 15, 15, are positioned between the vulcanizer sections and the respective mold sections. Suitable conduits (not shown) are provided for conducting vulcanizing fluid such as steam to the respective chambers 16, 17 in the mold sections. The adjacent faces of the mold sections define an annular molding cavity 18 for the work consisting of a pneumatic tire casing 19, there being an annular sealing ring 20 positioned between the beads of the tire and having flexible lips $20^a$, $20^a$ bearing against the inner wall of the tire. The sealing ring 20 is traversed by a flexible pipe 21 that conducts vulcanizing fluid from a suitable source (not shown) and delivers it to the interior of the tire 19.

Figure 3:
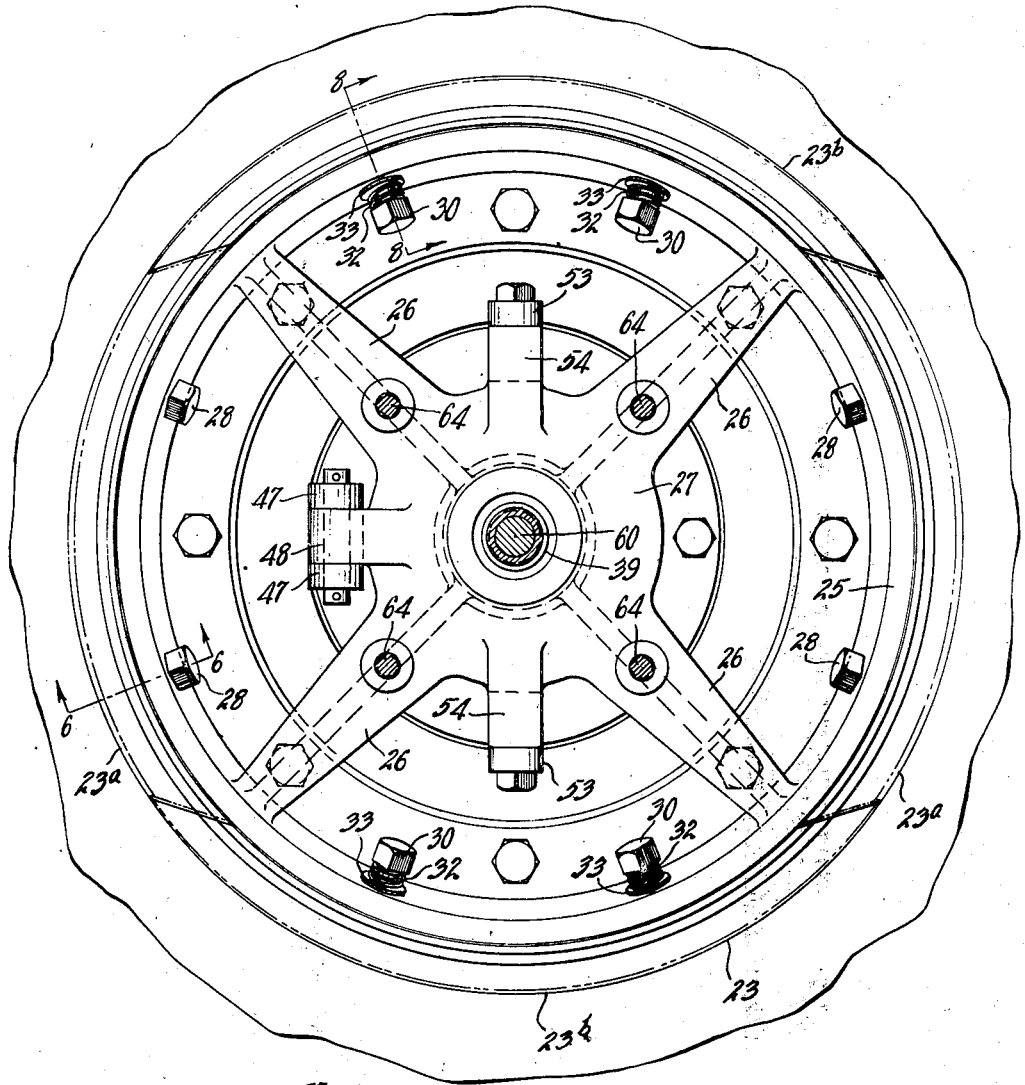
Figure 3 is a section on the line 3—3 of Figure 1, showing the bead-clamping ring in plan.
Figure 4:
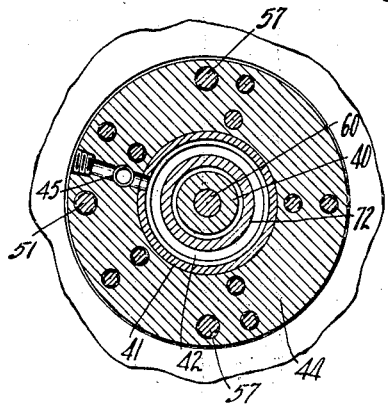
Figure 4 is a section on the line 4—4 of Figure 1.
Figure 5:
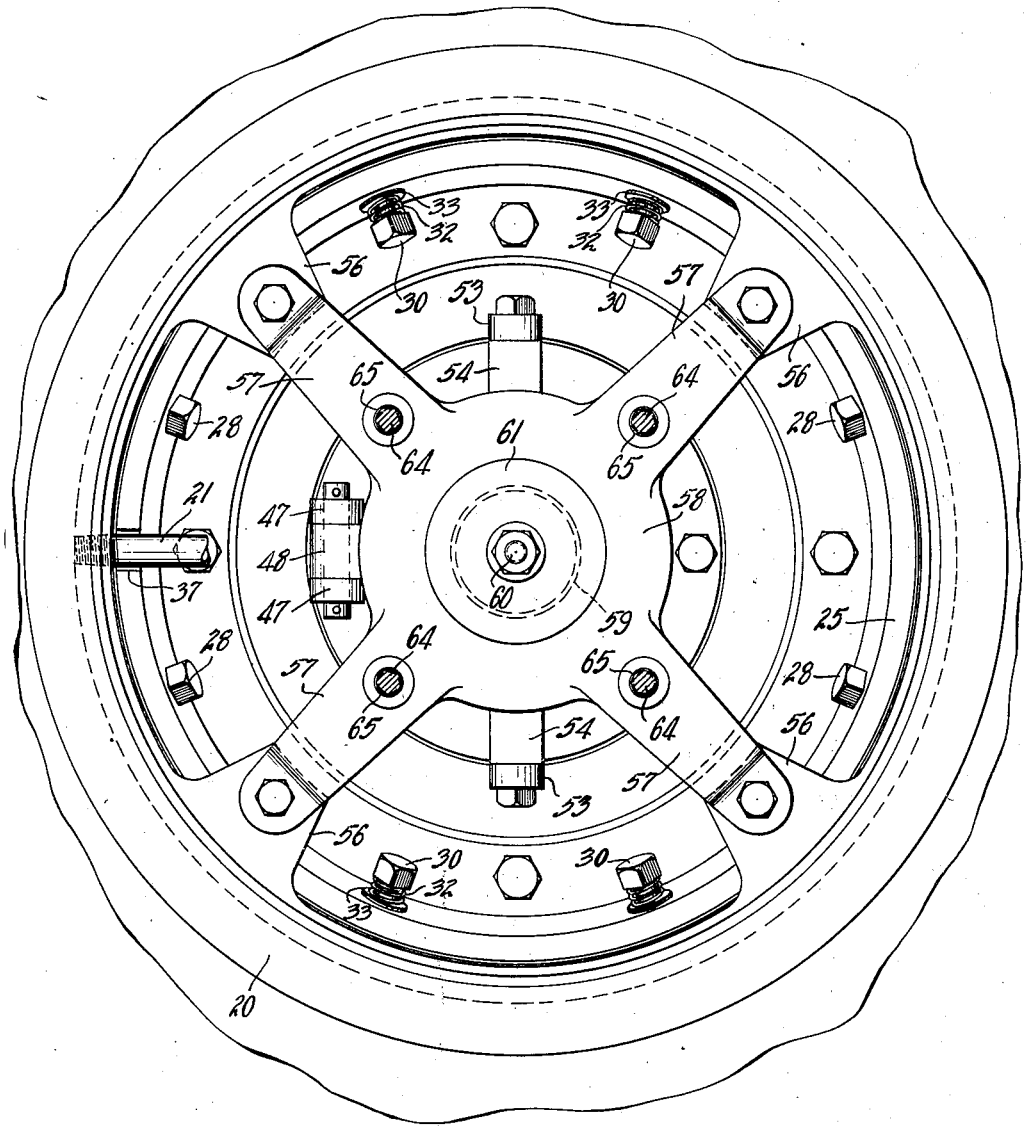
Figure 5 is a section on the line 5—5 of Figure 1, showing the sealing ring in plan.
Figure 6:
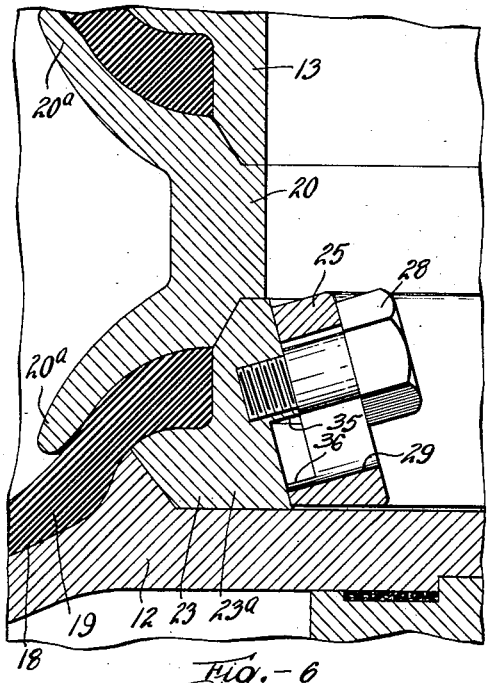
Figure 6 is a section on a larger scale on the line 6—6 of Figure 3.

The lower mold section 12 is cut away adjacent the bead of the tire to accommodate a sectional annular bead clamping ring generally designated 23 and comprising a pair of oppositely disposed key sections $23^a$, $23^a$, and a pair of intermediate sections $23^b$, $23^b$, the adjacent ends of said sections being oblique, as is most clearly shown in Figure 3, to permit withdrawal of the key sections whereby the way is cleared for limited withdrawal of the intermediate sections. The bead clamping ring 23 is adapted to engage the lower bead of the tire 19 and a portion of the inner periphery of the sealing ring 20 to hold said parts in determinate concentric positions, and the sectional ring is adapted to be collapsed sufficiently to break the adhesion between itself and contacting parts of the lower mold section, the tire, and the sealing ring, after the vulcanizing operation.

Figure 8:
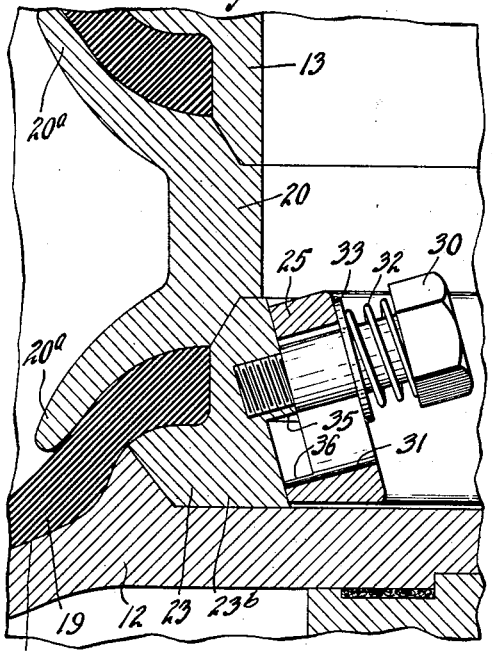
Figure 8 is a section on a larger scale on the line 8—8 of Figure 3.
Figure 9:
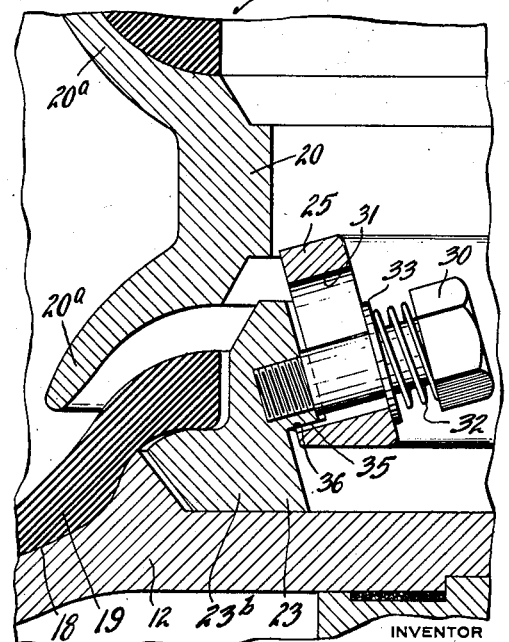
Figure 9 is a section similar to Figure 8 showing the parts in an alternative position.

The bead clamping ring 23 is carried upon the outer periphery of an endless ring 25 formed integrally with the radial arms 26, 26 of an axial structure or spider 27. The outer periphery of the ring 25 is generally frusto-conical in shape in that it tapers slightly downwardly as shown, the adjacent inner peripheral face of the bead ring 23 being complementally tapered. The respective key sections 23$^a$ of the bead ring are attached to the spider ring 25 by cap screws 28, 28 that extend through respective slots 29 formed in the ring 25 transversely thereof, the screws being threaded into the bead ring sections. Similarly the intermediate bead ring sections 23$^b$, are attached to the ring 25 by cap screws 30, 30 that extend through slots 31, 31 formed in the ring 25 and are threaded into the ring sections. The screws 30 are longer than the screws 28 to permit a compression spring 32 to be mounted upon each screw between its head and a washer 33 that bears against the inner periphery of ring 25, as is most clearly shown in Figures 8 and 9.

The arrangement is such that the cap screws 28, 30 will slide in their slots 29, 31 whereby axial movement of the bead ring sections with relation to the spider ring 25 is permitted, and said axial movement has a radial component by reason of the complementally tapered adjacent peripheral faces of the said rings. The said radial movement of the bead ring sections is inwardly when the spider 27 rises and outwardly at the termination of its downward movement. The yielding connection between the intermediate bead ring sections 23$^b$ and the ring 25 consisting of the springs 32 permits the key sections 23$^a$ of the bead ring first to move radially, inwardly, the intermediate sections 23$^b$ following up as fast as the movement of the key sections permits. The outward movement of the bead ring sections is practically concurrent, and occurs when the spider ring 25 continues to move downwardly after the bottom faces of the sections have come into contact with the lower mold section 12. Shoulders 25, 26 formed respectively upon the abutting faces of the bead ring sections and the spider ring serve to limit relative axial movement of said sections and ring in one direction, and to take strain off the cap screws 28, 30 in the lifting of the bead ring. The bead ring is recessed at 37 to accommodate the sealing ring inlet pipe 21 during the rising movement of the bead ring.

For raising and lowering the spider 27, said spider is axially mounted with a ball and socket connection 39 upon the upper end of a hollow piston rod 40 of a double acting fluid pressure actuated cylinder 41 of which 42 is the piston thereof. The cylinder 41 is vertically disposed, and is mounted in an axial recess 43 formed in the lower vulcanizer section, being supported by an adapter 44 that rests upon the margins of the recess 43 and engages the upper head of the cylinder. Fluid conductor pipes 45, 46 conduct pressure fluid from a suitable source (not shown) to the upper and lower ends respectively of the cylinder 41.

Figure 10:
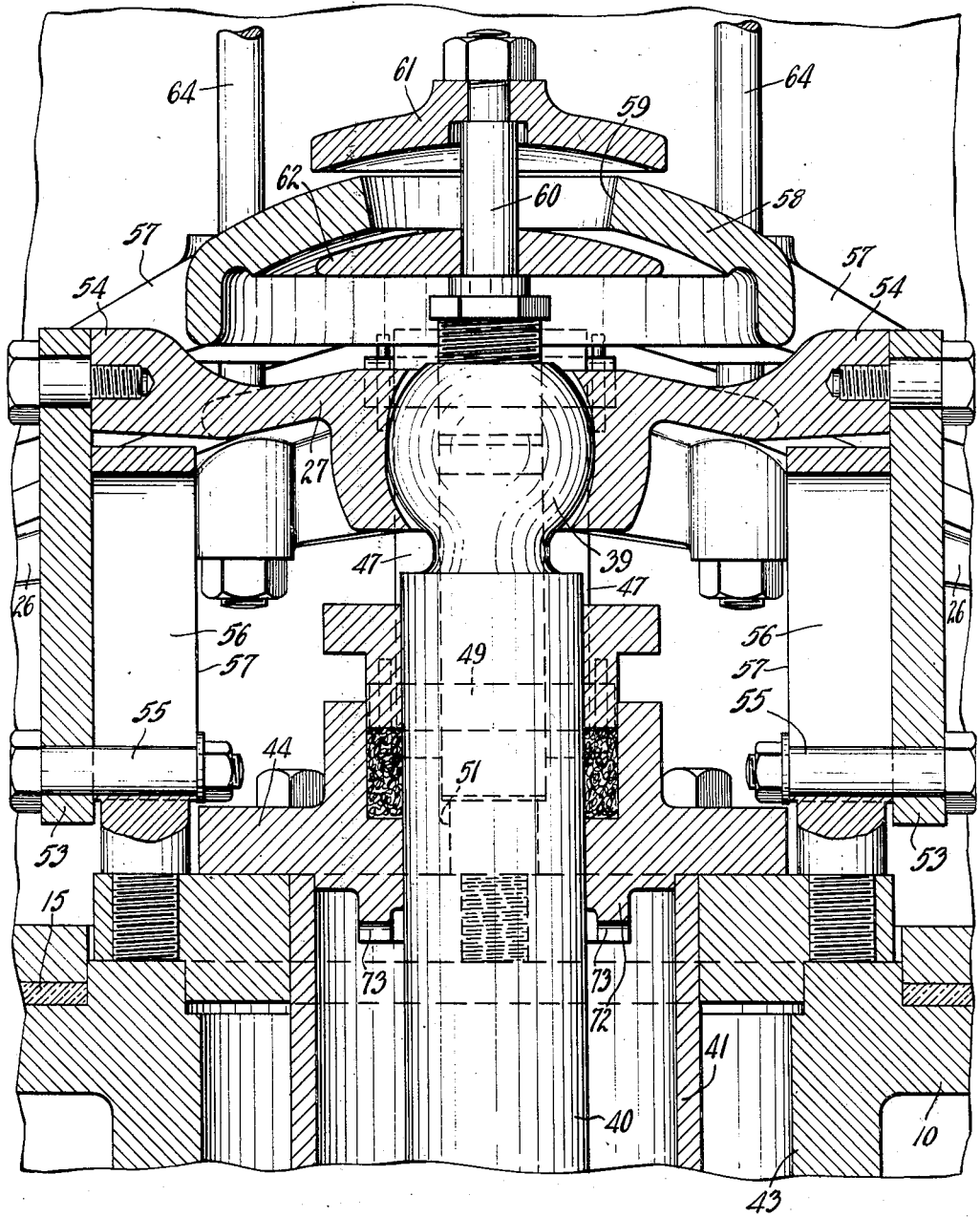
Figure 10 is a section on a larger scale on the line 10—10 of Figure 1.

It has been found advantageous in vulcanizers of the type herein shown to tilt the work, preferably toward the front of the vulcanizer, as it is lifted therefrom, whereby removal of the work is facilitated. To this end means is provided for tilting the spider 27 angularly with relation to the piston rod 40 as the spider is moved upwardly by said piston rod. Said means comprises a pair of links 47, 47 pivotally connected at their upper ends to an ear 48 formed on the spider 27 at the front thereof, the lower ends of said links being connected by a pin 49 that extends through and is slidable in a slot 50 formed in an upstanding post 51 rising from the adapter 45. The upper limit of the slot 50 is so positioned that the pin 49 engages the same before the piston rod 40 completes its upward movement, with the result that the spider 27 is tilted downwardly toward the front of the vulcanizer, as is most clearly shown in Figure 2, when the piston rod is fully elevated. Positioned 90 degrees each side of the links 47 are respective individual links 53, 53 that are pivotally connected at their upper ends to lugs 54, 54 formed at diametrically opposite points on the spider 27, the lower ends of said links being provided with respective laterally projecting studs 55 that slide within slots 56 formed in respective posts 57 rising from the adapter 44, as is most clearly shown in Figure 10. The links 53 are longer than the links 47 and permit the middle of the spider 27 to rise to the full elevation of the piston rod 40 while preventing downward tilting of the spider elsewhere than at the front thereof.

For moving the sealing ring 20 upwardly and downwardly in the operation of the vulcanizer, the inner peripheral wall of said ring is formed with integral inwardly extending lugs 56, 56 that are connected to the radially extending legs 57, 57 of a spider 58 that is positioned above the spider 27. The central portion of the spider 27 is concave on its under side and convex on its upper side, and is formed with a relatively large axial aperture 59 through which freely extends the upper end portion of a vertically movable piston rod 60. A concave cap 61 is mounted upon the upper end of the piston rod 60 above the spider 58, and a convex pad or seat 62 is mounted upon a shoulder on said piston rod below the spider 58, the cap 61 and pad 62 being spaced apart sufficiently to permit some axial movement of the spider relatively of the piston rod. The aperture 59 is so much larger than the piston rod 60 that extends through it as to permit limited angular movement of the spider relative to the piston rod, as is most clearly shown in Figure 2, and this angular movement is utilized to tilting the work downwardly at the front of the vulcanizer to facilitate the mounting and removal of the work.

For effecting the tilting of the spider 58 when the mold is open and the piston rods 40, 60 are in elevated position, the respective legs 26 of the spider 27 have secured thereto upwardly extending guide rods 64, 64 of uniform length that extend freely through respective apertures 65 formed in the legs 57 of the spider 58, the upper ends of the guide rods having enlarged retaining heads. The arrangement is such that the bead ring 23 and sealing ring 20 at all times are maintained in parallel planes, when disposed normal to the axial piston rods and when disposed at an angle thereto.

The piston rod 60 is mounted within an axial bore of the piston rod 40, the lower end of the latter being hollow to constitute a double acting fluid pressure cylinder 67 of which 68 is the piston thereof. The lower end of the cylinder 67 is closed by a head 69 that is threaded onto the piston rod 40 below the piston 42, said head 69 having an axial aperture 70 opening into the cylinder 41 that constitutes a fluid inlet and outlet for the lower end of the cylinder 67. A plurality of apertures or ports 71, 71 extend through the wall of the piston rod 40 and open into the cylinder 67 above the upper position of the piston 68, said ports constituting fluid inlets and outlets from the upper end of cylinder 67 to the upper end of cylinder 41. A concentric rib 72 is formed on the upper head of the cylinder 41 interiorly of the latter, which rib limits the upper position of the piston 42 to a point below the inlet port of the pipe 45. The rib 72 is traversed by a plurality of radial grooves 73, 73 which permit pressure fluid to pass the rib and enter the cylinder 67 through the ports 71 when the piston 42 is in raised position as shown in Figure 2.

Figure 7:
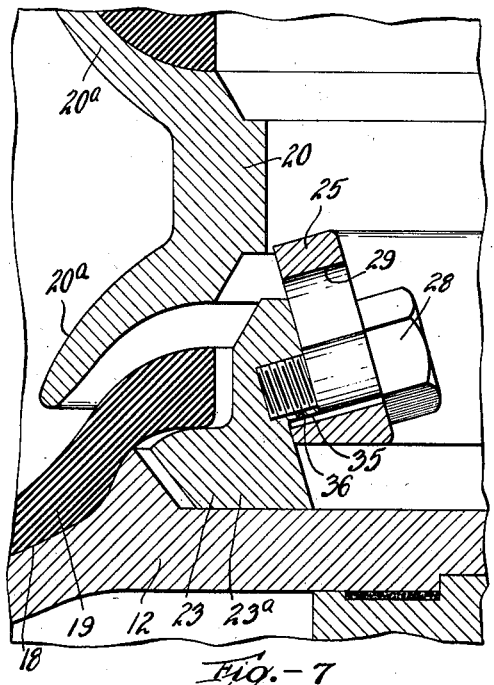
Figure 7 is a section similar to Figure 6 showing the parts in an alternative position.

In the operation of the apparatus, starting with the various parts in the positions shown in Figure 1, the initial operation of removing the vulcanized tire 19 is the evacuating of pressure fluid therefrom through the connection 21 of the sealing ring, after which the vulcanizer cover 11 is lifted and with it the upper mold section 13. Fluid pressure is then admitted to the lower end of cylinder 41 through pipe 46 which causes the piston 42 to rise, the piston rod 40 also moving upwardly and carrying with it spider 27 and ring 25. Adhesion of the tire 19 to the lower mold section 12 is sufficient to hold the sectional bead ring 23 stationary during the initial upward movement of the ring 25 so that the latter moves axially relatively of the bead ring with the result that the tapered surface of the ring 25 acts as a cam upon the several cap screws 28, 30 and causes said screws to pull the bead ring sections 23$^a$, 23$^b$ radially inward a small distance, as indicated in broken lines in Figure 3 and in full lines in Figures 7 and 9, whereby adhesion between the said bead ring sections and the tire, and between the sections and the lower mold is broken.

Figure 2:
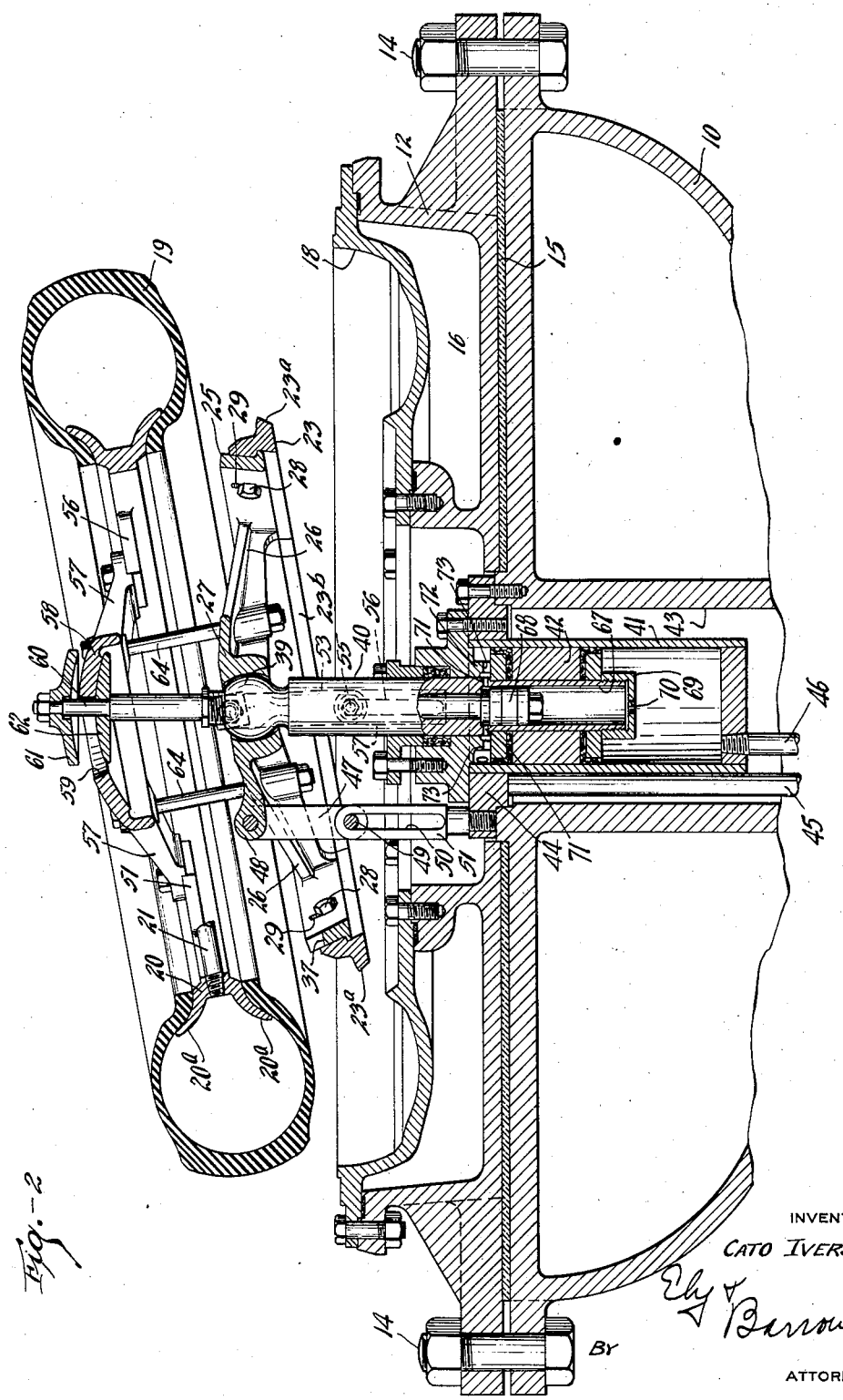
Figure 2 is a view of the parts shown in Figure 1 with the vulcanizer in open position, the cover thereof being removed.

The piston 42 continues to move upwardly in cylinder 41, causing the bead ring 23 to pull the tire 19 from the mold section 12, such movement of the piston continuing until stopped by the rib 72 in the cylinder, but before reaching its uppermost position the pin 49 of links 46 reaches the end of slot 50 in post 51 and prevents further rise of the front part of the spider 27, so that the latter tilts upon its ball and socket mounting 39 and comes to rest at an oblique position with relation to piston rod 40, substantially as shown in Figure 2. As the piston 42 comes to rest against the rib 72, the pressure fluid in the cylinder 41 flowing through port 70 into cylinder 67 moves the piston 68 and piston rod 60 upwardly and thus elevates the spider 58 with relation to spider 27 whereby the upwardly moving sealing ring 20 lifts the tire off the bead ring 23. It will be observed that the guide rods 64 maintain the spider 58 in a plane parallel to the plane of spider 27 at all times, so that in its elevated position the tire 19 is inclined downwardly toward the front of the vulcanizer. The tire is removed from the sealing ring 20 simply by pushing the tire into eccentric relation to said sealing ring whereby the latter locally emerges from between the beads of the tire, and then progressively stripping the tire from the remainder of the sealing ring.

In the mounting of a tire in the vulcanizer the sequence of operations described is reversed. After the unvulcanized tire is mounted upon the sealing ring, fluid pressure is vented from the lower end of cylinder 41 and admitted to the top thereof through pipe 45, said fluid passing through grooves 73 of the rib 72 and through ports 71 to the upper end of cylinder 67, thereby forcing piston 68 and its piston rod 60 downwardly whereby the tire and sealing ring are lowered into the bead ring 23 while the latter still is in collapsed position. When the piston 68 is lowered to its fullest extent in cylinder 67, and the tire and sealing ring rest upon the bead ring, the cap 61 and pad 62 are out of engagement with the spider 58 substantially as shown in Figure 1.

Next the piston 42 and piston rod 40 move downwardly carrying with them the piston rod 60, spider 58 and spider 27, and as the tire engages the molding cavity 18 at the front of the vulcanizer it causes the two spiders to move into horizontal position normal to piston rod 40. Axial movement of the bead ring 23 stops when it rests upon the lower mold member 12, the final movement of spider 25 causing the bead ring sections 23$^a$, 23$^b$ to move radially outwardly whereby the lower tire bead and inner periphery of the sealing rim are firmly gripped and centered, the action being similar to an expanding chuck. The vulcanizer cover 11 and upper mold half 13 are then lowered into place, and vulcanization of the tire commenced. This completes one cycle of operation.

The apparatus is relatively simple in its construction and operation, it performs mechanically some of the operations heretofore performed by hand, and it accomplishes the other objects set forth in the foregoing statement of objects.

Modifications may be resorted to without departing from the spirit of the invention, or the scope of the appended claims which are not limited wholly to the specific construction shown and described.

What is claimed is:

1. In a tire vulcanizing apparatus, the combination of a pair of mating mold sections, a bead clamping ring associated with one of said mold sections, a sealing ring adapted to seat between the beads of a tire associated with the same mold section, and power means for moving said bead clamping ring and said sealing ring axially of the mold section and axially with relation to each other.

2. In tire vulcanizing apparatus, the combination of a pair of mating mold sections, a sectional collapsible bead clamping ring associated with one of said mold sections, and means for moving radially all the sections of said bead clamping ring and thereafter moving said sections as a unit out of engagement with the mold section.

3. In tire vulcanizing apparatus, the combination of a pair of annular mating mold sections, an annular sectional bead clamping ring, associated with one of the mold sections, an endless ring upon which the bead ring sections are mounted, means for moving the endless ring axially with relation to the said mold section, and means on said endless ring for causing radial movement of the bead ring sections when the endless ring is so moved.

4. In tire vulcanizing apparatus, the combination of a pair of mating mold sections, an annular bead clamping ring associated with one of said mold sections, means for removing the bead clamping ring from the mold section by movement of translation normal to its own plane, and for inclining the bead clamping ring at an angle to its axis at the conclusion of said movement of translation.

5. In tire vulcanizing apparatus, the combination of a pair of mating mold sections, an annular bead clamping ring associated with one of said mold sections, a vertically reciprocable member pivotally connected to the bead clamping ring structure at the axis thereof for moving said ring toward and away from the mold section, and means for rocking the ring structure on its pivot at a determinate point in its movement away from the mold section.

6. In tire vulcanizing apparatus, the combination of a pair of mating mold sections, an annular bead clamping ring associated with one of said mold sections, a vertically reciprocable member having pivotal connection with the bead ring structure at the axis thereof for raising and lowering said ring, and means consisting of a lost motion link connected to one side of the bead ring structure for limiting the upward movement of one side thereof whereby it is tilted.

7. In tire vulcanizing apparatus, the combination of a pair of annular mating tire mold sections, an annular sectional bead clamping ring associated with one of the mold sections, and means for moving the sectional ring axially of the mold section including cam means for moving the bead ring sections radially of the mold section.

8. In tire vulcanizing apparatus, the combination of a pair of annular mating mold sections, an annular sectional bead clamping ring associated with one of the mold sections, an endless ring upon which bead ring sections are mounted, including co-operating cam surfaces on the endless ring and the bead ring sections adapted to move said sections radially when the endless ring is moved axially relatively thereof, and means for raising and lowering the endless ring in an axial direction.

9. In tire vulcanizing apparatus, the combination of a pair of mating mold sections, an annular sectional bead clamping ring associated with one of the mold sections, said sectional ring comprising key sections and intermediate sections, an endless ring within the sectional bead ring formed with tapered surfaces co-operating with complementally tapered surfaces on the bead ring sections, positive connections between the endless ring and the key sections, yielding connections between the endless ring and the intermediate sections, and means for raising and lowering the endless ring in a direction normal to its own plane.

10. In tire vulcanizing apparatus, the combination of a pair of mating mold sections, a bead clamping ring associated with one of said mold sections, a sealing ring adapted to seat between the beads of a tire associated with the same mold section, means for moving the bead ring and the sealing ring, as a unit, away from the mold section, and means for continuing the movement of the sealing ring a determinate distance after the bead ring has stopped moving.

11. In tire vulcanizing apparatus, the combination of a pair of mating mold sections, a bead clamping ring associated with one of said mold sections, a sealing ring adapted to seat between the beads of a tire associated with the same mold section, means for moving the bead ring and sealing ring as a unit away from the mold section, said movement being normal to the plane of the said rings, means for tilting the bead ring and sealing ring angularly at the conclusion of said movement, and means for thereafter moving the sealing ring away from the bead ring.

12. In tire vulcanizing apparatus, the combination of a pair of mating mold sections, a bead clamping ring associated with one of the mold sections, a sealing ring adapted to enter between the beads of a tire associated with the bead clamping ring, power means for raising and lowering the bead ring connected to the axis thereof, and power means for moving the sealing ring relatively of the bead ring connected to the axis of said sealing ring.

13. A combination as defined in claim 12 in which the respective power means for the bead clamping ring and sealing ring automatically operate in sequence.

14. In tire vulcanizing apparatus, the combination of a pair of mating mold sections, a bead clamping ring associated with one of said mold sections, a sealing ring adapted to enter between the beads of a tire concentric with said bead clamping ring, a vertically movable power member having pivotal connection with the axis of the bead ring adapted to raise and lower the latter, means for tilting the bead ring angularly at its raised position, and a vertically movable power member having pivotal connection with the axis of said sealing ring.

15. A combination as defined in claim 14 in which the power members automatically are operated in timed relation to each other.

16. In tire vulcanizing apparatus, the combination of a pair of mating mold sections, a bead clamping ring associated with one of said mold sections, a sealing ring associated with said bead clamping ring and concentric therewith, a vertically movable piston rod pivotally connected to the axis of the bead clamping ring, a vertically movable piston rod in telescoped relation to the first mentioned piston rod pivotally connected to the axis of the sealing ring, and means for actuating said piston rods in timed relation to each other.

17. A combination as defined in claim 16 including means for limiting the upward movement of one side of the bead clamping ring so as to tilt the same in its elevated position.

18. In tire vulcanizing apparatus, the combination of a pair of mating mold sections, a bead clamping ring associated with one of said mold sections, a sealing ring adapted to enter between the beads of a tire associated with said bead clamping ring and concentric therewith, individual power means pivotally connected to the respective axes of the sealing ring and bead clamping ring, for raising and lowering the same independently of each other, means for limiting the upward movement of one side of the bead clamping ring so as to tilt the same in its elevated position, and guide means slidably interposed between the bead ring and sealing ring for maintaining them always in parallel planes.

19. A combination as defined in claim 18 in which the bead ring is sectional, including means for effecting radial movement of the sections thereof.

20. In tire vulcanizing apparatus, the combination of mating mold sections, a sealing ring adapted to enter between the beads of a tire permanently associated with one of the mold sections, power means pivotally connected to the axis of the sealing ring for moving the same into and out of operative relation to the mold section, and means consisting of a limit link for tilting the ring on its pivotal axial connection during its movement away from the mold section with which it normally is associated.

21. In tire vulcanizing apparatus, the combination of mating mold sections, a concentric sealing ring adapted to enter between the beads of a tire permanently associated with one of said mold sections, means for moving the sealing ring axially toward and away from the mold section, and means for tilting the ring at an angle to its axis at the termination of axial movement away from the mold section.

22. A combination as defined in claim 21 including means for effecting further axial movement of the sealing ring after it has been tilted angularly at the termination of its first axial movement.

23. In tire vulcanizing apparatus, the combination of mating mold sections, a sealing ring adapted to enter between the beads of a tire associated with one of the mold sections, means pivotally connected to the axis of the sealing ring for moving the same axially toward and away from said mold section, means for tilting the ring in one direction after it has moved a determinate distance away from said mold section, and means for preventing its tilting in other directions prior thereto.

CATO IVERSON.